United States Patent Office 2,796,991
Patented June 25, 1957

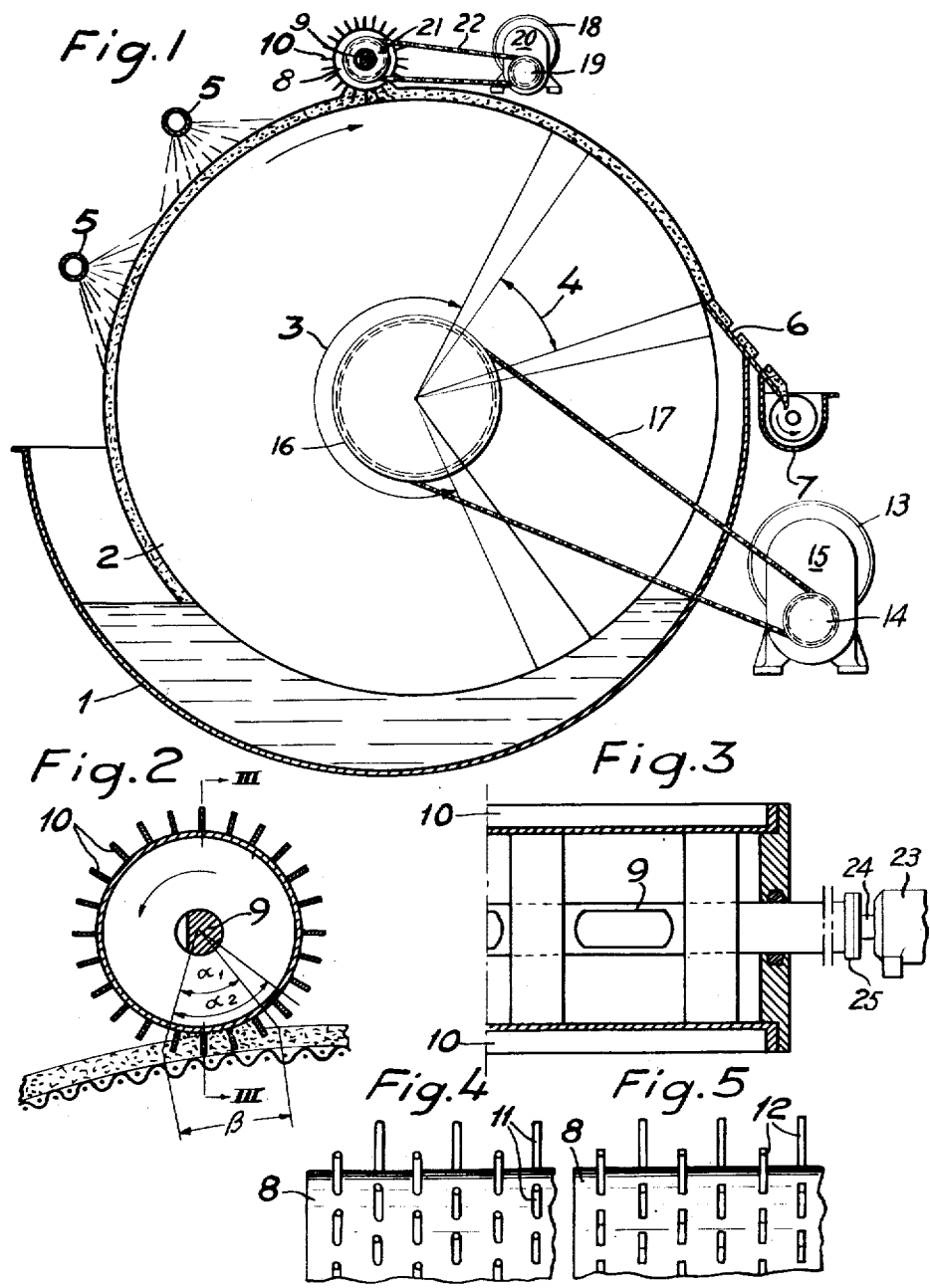

2,796,991
APPARATUS FOR THE DEWATERING OF SUSPENSIONS

Börje Sune Nyquist, Marmaverken, Sweden

Application March 20, 1953, Serial No. 343,625

Claims priority, application Sweden March 21, 1952

7 Claims. (Cl. 210—383)

The present invention relates to a method and an apparatus for the dewatering of suspensions such as, for example, suspensions of calcium carbonate obtained after caustification of the soda ash in the manufacture of cellulose according to the sulfate process. In such dewatering, rotary-drum vacuum filters, such as Oliver-filters or cell filters, are generally used. Said filters are of a type similar to those used for taking up or washing cellulose pulp. It is of great importance to carry out the dewatering as effectively as possible in order to reduce the fuel consumption as much as possible and to increase the recovery of alkali. Preferably, the suspension is subjected to a washing upon the filtering surface and is then subjected to a vibrating motion, for example, in a direction along the filter surface. The frequency of the vibrations is not to be below 1000 per minute and should preferably amount to 1500–5000 per minute. The present invention may also be applied in the concentration of ores, when a high dryness of the concentrate is desired.

It has now been found that an improved dewatering is obtained, if according to the present invention the vibrating motion is produced by means of a roller provided with projections, said roller rotating at a greater or less peripheric speed than the filter drum. The projections may consist of longitudinally extending flanges secured to the drum. They may also consist of projecting rod-like elements placed at a distance from each other. The projecting elements may have a circular or a rectangular cross section.

An embodiment of a filtering apparatus for the dewatering of a suspension of calcium carbonate obtained in the manufacture of cellulose pulp by caustification of soda ash is illustrated in the accompanying drawing. Fig. 1 is a cross section of the filter. Fig. 2 is a cross section of the vibrating roller on a larger scale and Fig. 3 is a section along the line III—III of Fig. 2. Fig. 4 and Fig. 5 show details of rollers provided with projections of different types.

1 indicates a receptacle such as a tank containing the suspension to be dewatered. The filter drum 2 is partly immersed in the tank 1 and rotates in the direction indicated by the arrow in Fig. 1. The suction section of the filter drum is indicated by 3 and the blowing-off section by 4. By means of spray pipes 5 the suspended solids deposited on the filter drum are washed with water and after the blowing-off section a scraper 6 rests against the filter drum and discharges the dewatered cake into a screw conveyor 7, by which it is transported to a kiln and burnt. Above the filter drum a roller 8 is provided, in which a shaft 9 is journalled having its centre of gravity eccentrically positioned. The shaft 9 rotates rapidly and thereby the roller 8 is caused to vibrate. The vibrating motion is transferred to the cake by means of projections on the roller which may be constituted by longitudinally extending flanges 10 of the roller 8. The flanges 10 should nearly touch the filter surface. The roller 8 rotates in the direction of the arrow as indicated in Fig. 1. Thus it will be seen that the flanges 10 on roller 8 move in the same direction as the periphery of the drum 2 adjacent thereto. The peripheric speed of the roller 8 is adjusted in such a way that it turns the angle $\alpha_2$ while the filter drum 2 turns the angle $\beta$ and has thus, a greater peripheric speed than the filter drum. If the peripheric speed of the filter drum and of the roller would be equal, the roller 8 would turn the angle $\alpha_1$, while the filter drum turns the angle $\beta$. The angle $\alpha_2$ is so much greater than the angle $\alpha_1$ as the angle corresponding to a flange pitch. The roller 8 will hereby with each flange push forward a small quantity of the filter cake a distance corresponding to a flange pitch and in the meantime said quantity will be subjected to the vibrating motion.

An embodiment of the roller 8 is shown in Fig. 4 according to which rod-like cylindrical projecting elements 11 are substituted for the flanges 10.

In the embodiment shown in Fig. 5 the projecting elements 12 consist of rods having a rectangular cross section, the longer side of the section being preferably perpendicular to the axis of the roller.

The rod-like elements may be fastened by means of projecting welding or the like. The rod-like elements may be positioned obliquely in the longitudinal direction of the roller.

The drum 2 is driven at a relatively low speed by any suitable means such as a reduction drive motor 13, there being a pulley 14 driven at the output shaft of the reduction gearing 15 and which is connected with a pulley 16, mounted on the drum shaft, by means of an endless chain or belt 17. The roller 8 is separately driven and also at a relatively slow speed by any suitable means such as a reduction drive motor 18, there being a pulley 19 driven at the output shaft of the reduction gearing 20 and which is connected with a pulley 21, mounted on the end of the roller 8, by means of an endless chain or belt 22. As indicated above, the two motor drives are so adjusted that the peripheral speed of the roller 8 is different from that of the drum 2.

The shaft 9 concentric with roller 8 and which extends through the same, as indicated in Fig. 3, for imparting a vibration to the roller, rotates at a relatively high speed and hence is driven independently of the drive for roller 8. As indicated in Fig. 3, the drive for the shaft 9 is constituted by another motor 23 and the motor shaft 24 is directly coupled at 25 to the shaft 9.

Having now described my invention, what I claim as new and desire to secure by Letters Patent is:

1. Apparatus for dewatering suspensions comprising a receptacle adapted to contain the suspension to be dewatered, a filter drum partly immersed in said receptacle, said drum being mounted for rotation on its axis thereby to form a filter cake on the exterior surface of said drum, means for rotating said drum in a given direction, means for removing said filter cake from the drum surface, and vibratory means positioned adjacent the surface of said drum and adapted to contact the filter cake in advance of said cake removing means for imparting a vibrating motion to said cake, said vibratory means comprising a roller having projections arranged around the periphery thereof and which extend into the filter cake and nearly touch the surface of said drum, and means for rotating said roller and simultaneously imparting vibrations thereto, the direction of rotation of said roller being such that the projections thereon move in the same direction as the periphery of said drum adjacent thereto and the peripheral speed of said roller being different from the peripheral speed of said drum.

2. Apparatus for dewatering suspensions as defined in claim 1 wherein the peripheral speed of said roller is greater than the peripheral speed of said drum.

3. Apparatus for dewatering suspensions as defined in claim 1 wherein the projections on said roller are constituted by flanges extending longitudinally of the roller axis.

4. Apparatus for dewatering suspensions as defined in claim 5 wherein the projections on said roller are constituted by rod-like members.

5. Apparatus for dewatering suspensions as defined in claim 4 wherein said rod-like members are of cylindrical cross section.

6. Apparatus for dewatering suspensions as defined in claim 4 wherein said rod-like members are of rectangular cross section, the longer side of the section being perpendicular to the axis of the roller.

7. Apparatus for dewatering suspensions as defined in claim 1 wherein the means for imparting vibratory motion to said roller comprises an eccentrically weighted shaft rotatable within and on the axis of said roller.

References Cited in the file of this patent

UNITED STATES PATENTS

| | | |
|---|---|---|
| 859,857 | Tracy | July 9, 1907 |
| 1,151,999 | Bird | Aug. 31, 1915 |
| 1,656,766 | Valentine | Jan. 17, 1928 |
| 1,854,230 | Schur | Apr. 19, 1932 |
| 2,123,593 | Vogel-Jorgensen | July 12, 1938 |
| 2,178,631 | Frost | Nov. 7, 1939 |
| 2,218,206 | Ackerly | Oct. 15, 1940 |
| 2,374,114 | McBerty | Apr. 17, 1945 |
| 2,382,492 | Lomax | Aug. 14, 1945 |

UNITED STATES PATENT OFFICE
CERTIFICATE OF CORRECTION

Patent No. 2,796,991

June 25, 1957

Börje Sune Nyquist

It is hereby certified that error appears in the printed specification of the above numbered patent requiring correction and that the said Letters Patent should read as corrected below.

Column 3, line 6, for the claim reference numeral "5" read -- 1 --.

Signed and sealed this 6th day of August 1957.

(SEAL)
Attest:
KARL H. AXLINE
Attesting Officer

ROBERT C. WATSON
Commissioner of Patents